April 11, 1939.  W. D. HALL  2,154,307
COMPENSATING MEANS FOR LONG-SCALE WATTMETERS
Filed July 8, 1937
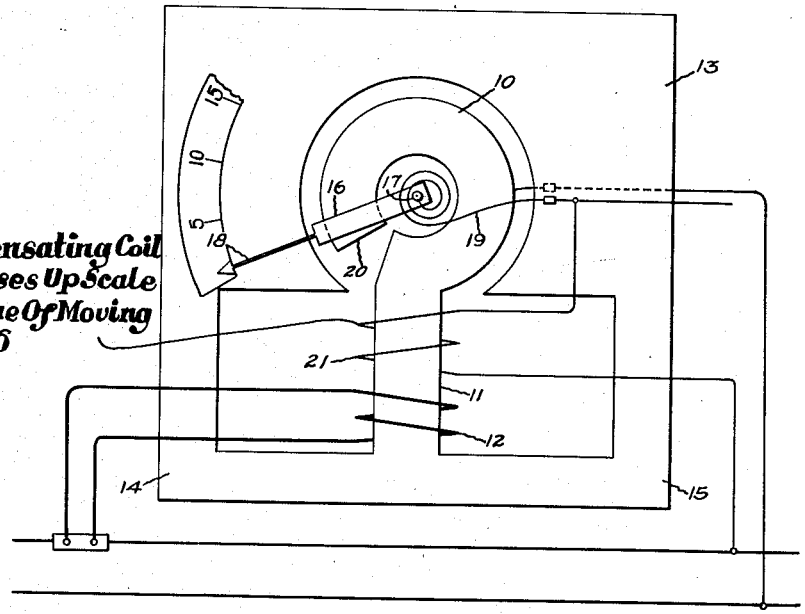
Inventor:
William D. Hall,
by Harry E. Dunham
His Attorney.

Patented Apr. 11, 1939

2,154,307

UNITED STATES PATENT OFFICE 2,154,307

COMPENSATING MEANS FOR LONG-SCALE WATTMETERS

William D. Hall, West Lynn, Mass., assignor to General Electric Company, a corporation of New York Application July 8, 1937, Serial No. 152,554

4 Claims. (Cl. 171—95)

My invention relates to instruments of the wattmeter type and in particular to long-scale instruments, and its object is to compensate such instruments for errors due to a small but undesirable torque caused by the voltage coil flux acting alone.

The reason for and the means for compensating for the error in question will be explained more fully below in connection with the accompanying single figure of the drawing showing the essential parts of a wattmeter to which the invention has been applied. The features of the invention which are believed to be novel and patentable will be pointed out in the claims appended hereto.

Referring to the drawing, I have here shown the essential parts of a wattmeter-type instrument employing a magnetic circuit and coil arrangement such as will produce a long-scale deflection, for example, of the order of two hundred and seventy degrees. The magnetic circuit includes a central C-shaped core part 10, which is secured to the remainder of the magnetic structure by a suitable yoke part 11 on which the current coil 12 is wound, and the parallel yoke branches 14 and 15. The outer part or outer pole piece 13 of the magnetic circuit has a circular opening but not necessarily a true circle, surrounding the C-shaped part 10 to form the circular air gap in which the potential or voltage coil 16 moves. The coil 16 is suitably pivoted at the center 17 and embraces the C-shaped core part 10. The moving coil system carries a pointer 18 and is biased to the zero-indicating position by suitable spiral springs, one of which is shown at 19, and such spirals may also serve to connect the moving coil 16 to the external circuit. The zero-indicating position is with coil 16 near one end, for example the open end 20 of the C-shaped core structure at about the position shown in the drawing.

It will be evident that the flux produced by the current coil 12 crosses the air gap between the concentrically arranged pole pieces 10 and 13 and returns to the limb 11 through the branches 14 and 15. The potential coil 16 tends to move around to the right so as to embrace as much of the current flux as possible or, in the case of an alternating-current wattmeter, the component of current flux which is in phase with the flux produced by the potential coil and, hence, there is a torque proportional to watts tending to move the potential coil moving system around to the right, which torque is opposed by the spiral springs or other suitable restraining means and there results a deflection proportional to watts.

Such a meter without the compensation now to be described has an error due to the solenoid effect between the potential coil and the C-shaped core. For example, when there is no current flowing in the current coil 12 and the potential coil 16 is energized, coil 16 tries to move away from the open end 20 of the C-shaped core part 10 so as to embrace a lower reluctance portion of the magnetic circuit or to become more fully interlinked therewith. The action is analogous to the attraction between the core and coil of a solenoid when its coil is energized. As a consequence, there is in this case a small "upscale" torque due to the potential coil alone, which exists when this coil is energized, which varies with the voltage irrespective of energization of the current coil, and which introduces an error into the wattmeter reading. This may be illustrated by the following example:

In one case, let us assume that a voltage of 110 and a current of 4 amperes is applied to the voltage and current coils, respectively, giving a wattage of 440. This will produce a certain deflection. Now, assume a voltage of 120 and a current of 3.666 amperes, which gives the same wattage and should give the same deflection. However, due to the increased solenoid effect of the potential coil at the higher voltage, the indication will be slightly higher than previously unless this solenoid effect is compensated for. The error due to such effect in the type of wattmeter represented may be substantially reduced by providing a voltage-compensating coil 21 about the central limb 11, wound or connected to produce a flux in the C-shaped core that in this case opposes the flux set up by the potential coil 16 therein; that is, the compensating coil 21 connected in series with the potential coil 16 produces a small repelling effect on the moving coil system which opposes the small "upscale" torque due to the solenoid effect of the voltage coil 16 alone. If such "upscale" erroneous torque increases due to an increase in voltage, the opposing compensating torque likewise increases for the same reason.

It has been found that best results are obtained if the compensating coil contains about half as many turns as the potential coil 16. This results in perfect compensation at midscale deflection of the meter and appreciably reduced error at other points of the scale as compared to an uncompensated meter. I am thus enabled to provide a sensitive long-scale wattmeter having high accuracy.

In accordance with the provisions of the patent statutes, I have described the principle of operation of my invention together with the apparatus which I now consider to represent the best embodiment thereof but I desire to have it understood that the apparatus shown is only illustrative and that the invention may be carried out by other means.

What I claim as new and desire to secure by Letters Patent of the United States is:

1. A wattmeter comprising, a magnetic circuit containing an air gap, a stationary current coil for producing a flux through said magnetic circuit, a pivotally mounted voltage coil mounted for movement in the air gap of the magnetic circuit in such a way that movement of the voltage coil about its pivot causes a progressive variation in the extent to which said moving coil interlinks the magnetic circuit, whereby, when said moving coil is energized, it tends to move into better interlinking position with respect to said magnetic circuit independently of any current coil flux therein, and a compensating coil on said magnetic circuit connected in series opposition with said voltage coil for counteracting said tendency, said compensating coil being so proportioned with respect to the voltage coil as to cause the movement of said voltage coil to be more nearly proportional to the product of the current and voltage applied to said current and voltage coils than would be the case without such compensation.

2. A measuring instrument comprising, a magnetic circuit having concentrically located circular inner and outer pole piece parts separated by a circular air gap, the inner pole piece part comprising a C-shaped core, a magnetic yoke joining one end of the C-shaped core part to the outer pole piece part, a current coil on the yoke for producing a current flux across the air gap, a voltage coil threaded by the C-shaped core and pivoted at the center thereof so as to rotate in the circular air gap in response to the torque resulting from the interaction of the fluxes produced by said two coils, means for resiliently opposing such torque, and a stationary coil wound on said yoke and energized with said voltage coil in a direction to oppose the flux of the voltage coil in said core and having a sufficient number of turns approximately to counteract the average solenoid torque effect of said voltage coil acting alone with respect to the C-shaped core.

3. An instrument comprising, a magnetic circuit having inner and outer parts separated by a circular air gap, the inner part comprising a C-shaped core member, one end of the C being magnetically connected to the outer part of the magnetic circuit, a current coil for producing a current flux through the magnetic circuit and across the air gap, a voltage coil threaded by said C-shaped core member and pivoted at the center of the C so as to rotate about such pivot in said air gap, and a stationary compensating coil connected in series opposition with the voltage coil and having about half as many turns as said voltage coil.

4. An instrument having a magnetic circuit including inner and outer circular pole pieces defining an air gap in such magnetic circuit, the inner pole piece comprising a C-shaped core part with one end of the C open and a magnetic yoke joining the other end of the C part to the outer pole piece, a current coil wound on the yoke for producing a current flux across the air gap, a voltage coil pivoted for rotation at the center of the C-shaped pole piece and embracing the section of such pole piece so as to rotate in the air gap toward and away from the open end of the C-shaped pole piece, whereby a torque is produced tending to rotate said voltage coil away from such open end in proportion to the in-phase energization of the current and voltage coils, resilient means tending to hold the voltage coil at a position near the open end of such C-shaped pole piece, and means for compensating the tendency of the voltage coil to move away from such open end position when it is energized alone comprising means proportional to the voltage applied to such voltage coil for producing a repelling flux in said C-shaped core piece of roughly half the strength of the flux produced by the voltage coil.

WILLIAM D. HALL.